United States Patent [19]
Anderson et al.

[11] 3,799,178
[45] Mar. 26, 1974

[54] EXTRUSION DIE CLEANING APPARATUS

[75] Inventors: Vernard C. Anderson, Painted Post; Francis A. Cantaloupe, Horseheads; Kenneth T. Overman, Painted Post, all of N.Y.

[73] Assignee: Corning Glass Works, Corning, N.Y.

[22] Filed: Oct. 30, 1972

[21] Appl. No.: 302,128

[52] U.S. Cl............... 134/58 R, 134/140, 134/144, 134/153, 134/172
[51] Int. Cl............................................. B08b 3/02
[58] Field of Search........ 134/57 R, 58 R, 140, 144, 134/149, 152, 153, 172

[56] References Cited
UNITED STATES PATENTS

| | | | |
|---|---|---|---|
| 1,382,915 | 6/1921 | Huggins | 134/140 |
| 2,515,702 | 7/1950 | Douglass | 134/152 X |
| 3,070,103 | 12/1962 | Pickard et al. | 134/153 X |
| 3,101,728 | 8/1963 | Broge | 134/144 X |
| 3,688,782 | 9/1972 | Smith | 134/152 X |

Primary Examiner—Robert L. Bleutge
Attorney, Agent, or Firm—Charles W. Gregg

[57] ABSTRACT

An apparatus or machine for cleaning dies used for extrusion-forming of a ceramic material in a plastic state into formed cylindrical bodies or articles of the material. The apparatus comprises a support member for horizontally supporting within a fluid-tight enclosure, vat, tub, tank or chamber, a die to be cleaned, a motor for rotating the support and die at a selected speed and for reciprocatively and linearly moving the outlet end of a high pressure ejection nozzle across at least part of the upper face of the supported and rotating die at a speed synchronized with the speed of rotation of the die, and a conduit for supplying a fluid cleaning material to the nozzle at a high pressure and ejecting such material from the outlet end of the nozzle against the upper face of the rotating die and against any of the ceramic material remaining in the extrusion channels or passages extending vertically through the horizontally supported die.

8 Claims, 1 Drawing Figure

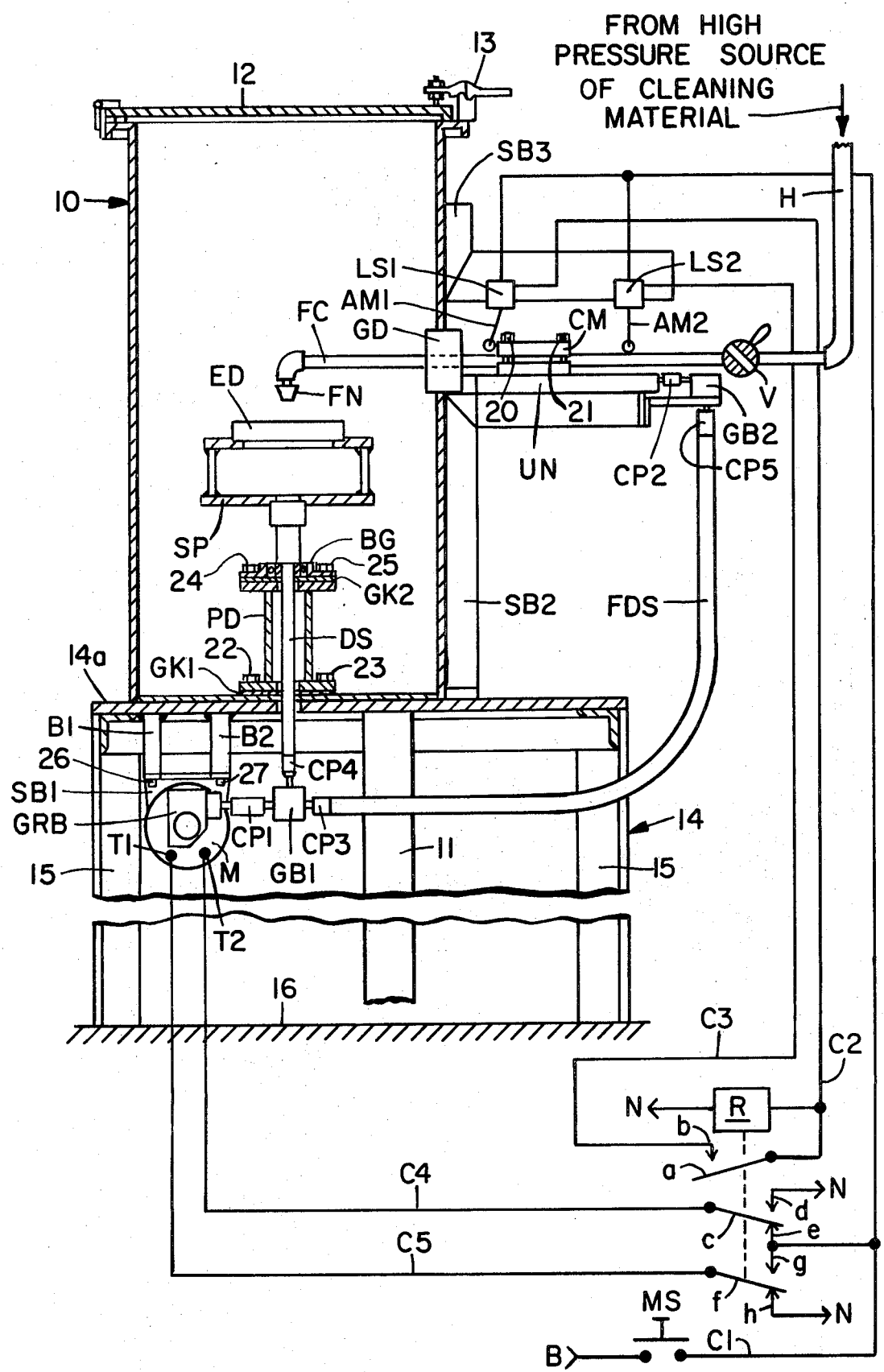

3,799,178

EXTRUSION DIE CLEANING APPARATUS

BACKGROUND OF THE INVENTION

Extrusion dies, having extrusion passages or channels each of a relatively minute cross-section areal expanse extending therethrough and periodically employed for extrusion-forming of ceramic materials in a plastic state into formed cylindrical bodies or articles of such materials and such bodies to be used, for example, as core members in catalytic converters for exhaust gases from internal combustion engines, are usually not immediately usable, following any extended periods or period of lack of use of the extrusion dies for their intended purpose, unless the plastic ceramic material extruded through the dies, during a period of use immediately prior to the period or periods of nonuse of the dies, is removed from the extrusion passages or channels of the dies and not permitted to harden or become partially set in such passages or channels. A manual method of cleaning said dies, especially prior to a period or periods of non-use of the dies and using a high-pressure nozzle or jet of fluid cleaning material, such as water under pressure for example, was heretofore developed and is disclosed and claimed in copending U.S. Pat. application Ser. No. 284,571 of L. M. Holleran and entitled Method of Cleaning Extrusion Dies, such application being filed on Aug. 29, 1972 and assigned to the same assignee as the present application. However, the method disclosed in said copending application requires a relatively long period of time such as on the order of two hours, for example, even when the cleaning is performed continuously. Furthermore, the steady cleaning of said dies by said manual method is extremely fatiguing for one person to perform and, therefore, two persons are usually assigned to the cleaning task for purposes of spelling-off one another. Accordingly, the manual cleaning of the extrusion dies of the type mentioned is a relatively expensive operation. It is, therefore, an object of the present invention to provide an apparatus or machine for automatically cleaning said extrusion dies.

It is another object of the present invention to provide an apparatus for the purpose stated, such apparatus performing the desired cleaning operations in a period of about fifteen minutes as compared with the above-discussed approximate two hour cleaning period required by the aforesaid manual cleaning method.

Other objects and characteristics features of the present invention will become apparent as the description proceeds.

SUMMARY OF THE INVENTION

The invention is believed to be adequately summarized in the foregoing abstract of the disclosure and, therefore, in order to prevent unnecessary redundancy or repetition, no further summary of the invention is considered necessary nor will be given in order to make the present specification as brief as possible.

BRIEF DESCRIPTION OF THE DRAWINGS

The single drawing FIGURE in the case comprises an elevational view, substantially in cross-section, of an apparatus or machine embodying the invention and including a schematic wiring diagram of a control system for the apparatus or machine.

PREFERRED EMBODIMENT OF THE INVENTION

Referring to the drawing in the case, there is shown, in cross-section, a vat, tub, tank, enclosure or chamber 10 of a generally fluid-tight construction with the exception of a drain pipe 11 provided at the bottom thereof and the possible exception of the upper end or top of such vat or enclosure. However, it is preferred that a fluid-tight lid such as 12 be provided for vat or tank 10, such lid, when provided, being hinged to the side of the tub; vat or tank adjacent the top rim thereof for fluid-tight closing of the tub or tank by a suitable clamping means such as 13, and subsequent opening of said lid when desired, said clamping means preferably being one of the quickly actuated types which are well known in the art. The larger end of tank, tub, vat or enclosure 10 rests and is supported on the top 14a of a table or support frame 14 which is secured to and supported on the upper ends of a plurality of legs such as 15 whose lower ends rest on and one secured to a platform, base or floor such as 16. The previously mentioned drain pipe 11, provided at the bottom of tank, vat or tube 10, extends downwardly through said top 14a of table or support frame 14 and the lower end of such drain pipe is arranged to connect with a suitable fluid sink or drain which is not shown in the drawings for purposes of simplification thereof but which arrangement will be readily apparent to those skilled in the art.

A fluid conduit FC extends through a suitable fluid-tight gland GD provided in the right-hand side (viewing the drawing) of tank, vat, tub or enclosure 10, said conduit extending through said gland in a relatively snug but reciprocatively movable relationship therewith as will be readily apparent to those skilled in the art. An inverted L-shaped support bracket SB2 is secured, in any convenient manner such as by welding for example, to said one side of tank, vat, tub or enclosure 10 and to said top 14a of table or support frame 14, and a worm-driven slide unit UN is secured, also in any convenient manner, to the top surface of the horizontally extending arm portion of said support bracket SB2. Slide unit UN may, for example, be a "UNISLIDE" assembly which is sold by VELMEX, incorporated whose address is P. O. Box 78, Holcomb, New York 14469. When such a slide unit is employed for component UN, there is included a sliding member in the slide unit to which a clamping member such as CM may be secured for movement with the sliding member as the worm-drive of the slide unit UN is rotated as hereinafter further discussed.

Above-mentioned clamping member CM is securely clamped, as by suitable bolts 20 and 21, about the outer periphery of fluid conduit FC and such conduit is thereby moved, along with clamping member CM, when the aforesaid sliding member of sliding unit UN is moved as mentioned above and as further discussed hereinafter. As shown in the drawing, the left-hand end of fluid conduit FC is connected through a 90° elbow to a high pressure fluid nozzle FN whose outlet end is preferably directed vertically downward as shown in the drawing. The right-hand end of fluid conduit FC (viewing the drawing) is connectable through a manually actuable flow control valve V and a flexible conduit or hose H to a source of cleaning material such as an oil, water or mixture of both, or a slurry of either or both, mixed with a suitable solvent and a suitable powdered cleaning material for example. Water at a relatively high temperature has been found to usually be the most ideal cleaning agent to be used but this, of course, depends on the composition of the materials extruded through each die to be cleaned by the apparatus or machine of the present invention. The above-mentioned high pressure source of cleaning material is omitted from the drawings for purposes of simplification thereof.

There is internally provided, at approximately the center of the bottom of tank, vat, tub, or enclosure 10, a hollow pedestal PD which is secured, as by bolts such as 22 and 23, against the inner surface of the bottom of the enclosure 10 with a fluid-proof gasket member GK1 being disposed between the bottom of pedestal PD and said inner surface. A second fluid-proof gasket GK2 rests on the upper surface of pedestal PD and a rotational bearing BG is secured against the top surface of gasket GK2 as by bolts such as 24 and 25. A drive shaft DS extends through the hollow of pedestal PD and at its upper end extends through the inner race of said bearing BG with an enlarged shoulder portion of such drive shaft resting on said inner race. The entire arrangement shown in the drawing is, of course, intended to be as fluid-tight as possible to prevent or deter any of the aforesaid cleaning material or fluid from excaping from tank, tub, vat or enclosure 10. There is supported on the upper end of drive shaft DS an extrusion die support member in the form of a framework or spider SP which is keyed to said upper end of the drive shaft for rotation therewith as hereinafter discussed. An extrusion die such as ED which is to be cleaned is held in an opening in the upper surface of spider or support member SP for rotation therewith and it will be readily understood that support member or spider SP comprises an open framework so that expended cleaning material and any material washed, cleaned or forced from a die such as ED will fall or be pushed towards the bottom of tank, vat, tub or enclosure 10 to be eventually exuded downwardly through drain 11 and thence to waste or the suitable fluid sink previously mentioned.

The lower end of drive shaft DS extends downwardly through concentric orifices in the bottom of tank, vat or tub 10 and in top 14a of support frame or table 14, and is rotatably connected through a coupling CP4 to one output shaft of a gear box GB1. The input shaft of gear box GB1 is connected through a coupling CP1 to the output shaft of a gear reduction box GRB which is connected in any of the well-known conventional manners to the output shaft of a motor M discussed hereinafter. Gear box GB1 includes a second output shaft which is connected through a coupling CP3 to the input end of a flexible drive shaft FDS whose output end is connected through a coupling CP5 to the input shaft of a gear box GB2. The output shaft of gear box GB2 is connected through a coupling CP2 to the aforementioned worm drive of slide unit SU.

Above mentioned motor M is supported by a support bracket SB1 which is fastened to the bottom ends of a pair of depending support bars or members B1 and B2 by bolts such as 26 and 27. The upper ends of support bars or members B1 and B2 are secured, as by welding for example, to the lower surface of top 14a of table or support frame 14. As shown in the drawing, motor M is a reversible direct current motor whose output or drive shaft is driven in a first or second direction according to the polarity of the current supplied to input terminals T1 and T2 of such motor and as discussed in detail below. Motor M may, however, be an alternating current motor whose output or drive shaft is rotated in first or second directions according to the actuation of control circuits for such a motor and as is well known in the art.

An L-shaped support bracket SB3 is also secured, as by welding for example, to the right hand side of tank, vat, tub or enclosure 10 (viewing the drawing) and there is attached thereto, in any convenient manner, a pair of limit switches LS1 and LS2 which have actuating arms AM1 and AM2, respectively, extending downwardly from the respective limit switch. Limit switch LS1 internally includes a set of normally open electrical circuit controlling contacts which are actuated to a circuit closing condition when the actuating arm AM1 of such switch is actuated or pushed in the left hand direction (as shown in the drawing) by being pushed in such direction by previously mentioned cam CM. Limit switch LS2 internally includes a set of normally closed electrical circuit controlling contacts which are actuated to a circuit opening or interrupting condition when the actuating arm AM2 of such switch LS2 is actuated or pushed in the right hand direction (viewing the drawing) by being pushed in such direction by said cam CM. The sets of contacts of both of said limit switches return to their above stated normal conditions when cam CM no longer actuates or pushes either of said actuating arms AM1 or AM2 in the directions mentioned. Limit switches such as LS1 and LS2 are well known in the art and their purpose will be discussed hereinafter in giving an operational example of the energization of motor M across said terminals T1 and T2 thereof.

A source of direct current is provided for the energization of motor M and is partially controlled by a relay R to be hereinafter discussed. However, such source is not shown in the drawing for purposes of simplification thereof but its positive and negative terminals are designated B and N, respectively. A master switch MS is provided for manual control of the supply of said current and one of the terminals of such switch is connected to said positive terminal B of said current source while the second terminal of the switch is connected to one end of an electrical conductor designated C1 whose second end is connected to said limit switches LS1 and LS2 for supply of current thereto. Master switch MS is shown as a push button type whose contacts are closed to complete an electrical circuit therethrough when the push button of the switch is depressed. Such push button is pulled when it is subsequently desired to interrupt said electrical circuit by the re-opening of the contacts of the switch. Switches such as MS are well known in the art.

Previously mentioned relay R is provided with three sets of circuit controlling contacts, the first of which sets comprises a movable contact member *a* which closes against a fixed contact member *b* when the control winding of relay R is energized as hereinafter discussed. The second of said sets of contact comprises a movable contact member *c* which is closed against a fixed contact member *e* when the winding of the relay is deenergized and closes against a fixed contact member *d* when the winding of the relay is energized. Movable contact member *c* again closes, of course, against fixed contact member e when the winding of the relay is again deenergized. The third set of contacts comprises a movable contact member f and fixed contact members g and h which correspond to said second set of contacts c, d and e, respectively, and are actuated similarly to that discussed for this latter set of contacts.

Relay R has a control or energizing circuit which may be traced from previously mentioned terminal B of said source of direct current through master switch MS in its closed condition and over previously mentioned conductor C1 to limit switch LS1 and through the previously mentioned internal contacts in such limit switch when such contacts are closed due to actuating arm AM1 of switch LS1 being actuated to the left by clamping member CM as previously discussed, and thence over an electrical conductor C2 and through the winding of relay R to terminal N of the direct current source. When relay R is energized over said circuit, it closes its set of contacts a-b and the relay is then temporarily held energized over a holding circuit which may be traced from said conductor C1, through the previously mentioned normally closed internal contacts in limit switch LS2 and thence over an electrical conductor C3 and contacts a-b of relay R through the control winding of relay R to said negative terminal N of the current source. Thus, once relay is energized over its pickup or energizing circuit traced above, it is held energized over its said contacts a-b until the actuating arm AM2 of limit switch LS2 is actuated to the right by clamping member CM as previously discussed and the normally closed internal contacts of the limit switch are thereby temporarily actuated to open to deenergize the winding of relay R and cause contacts a-b of the relay to again open.

When master switch MS is closed, as mentioned above, and relay R is deenergized, motor M is energized over a circuit which extends from condcutor C1, contacts c-e of relay R, an electrical conductor C4 to terminal T2 of motor M and through the winding of the motor to terminal T1 thereof and thence over an electrical conductor C5 and contacts f-h of relay R to terminal N of the current source. At such time motor M is driven in a direction to drive flexible drive shaft FDS in a direction to, in turn, drive the previously mentioned slide member of slide unit UN and clamping member CM in a left hand direction (viewing the drawing) and thereby move fluid conduit FC in a corresponding direction until member CM finally contacts and actuates actuating arm AM1 of limit switch LS1 in said left hand direction. Such actuation of arm AM1 closes the previously traced energizing circuit for relay R and such relay then closes its holding circuit over its own contacts a-b and the previously mentioned normaly closed contacts of limit switch LS2.

The above discussed energization of relay R also actuates movable contact members c and f of such relay to change the polarity of the direct current supplied to the winding of motor M. The energizing circuit for such winding may now be traced from conductor C1 over contacts f-g of relay R and conductor C5 to terminal T1 of motor M, through the winding of such motor to terminal T2 thereof, and thence over conductor C4 and contacts c-d of relay R to terminal N of the current source. Motor M is then driven in a direction opposite to its previous driven direction and drive shaft FDS is correspondingly driven to, in turn, drive said slide member of slide unit UN and clamping member CM in a right hand direction (viewing the drawing) and thereby move fluid conduit FC in a corresponding direction until member CM finally contacts and actuates actuating arm AM2 of limit switch LS2 in said right-hand direction. Such actuation of arm AM2 opens the previously traced holding circuit for relay R and such relay then releases to close its sets of contacts c-e and f-h which again changes the polarity of the current supplied across the winding of motor M. Such motor then again reverses its direction of rotation to again drive fluid conduit FC in its above mentioned left hand direction. Such operation of the control system for the apparatus continues until master switch MS is actuated to open its contacts and interrupt the supply of current to motor M and relay R.

It is pointed out that each time motor M reverses its direction of rotation as discussed above, drive shaft DS is also reversed in its direction of rotation, and support member or spider SP and an extrusion die such as ED supported thereon are also reversed in their directions of rotation. However, such operation does not in any manner affect the efficiency of the cleaning apparatus or machine. It is also pointed out that fluid conduit FC and, therefore, nozzle FN are reciprocatively actuated, as discussed above, through a path of travel slightly greater than the radius of the extrusion die such as ED. This also does not affect the efficiency of the cleaning apparatus or machine since support member or spider SP and its supported die such as ED are rotated during said reciprocative actuation of conduit FC and, therefore, cleaning material issuing from nozzle FN impinges against the entire upper surface of die ED and into its embodied extrusion forming passages or channels at various times during a cleaning operation.

BRIEF OPERATIONAL EXAMPLE OF THE INVENTION

Although the operation of the cleaning apparatus or machine embodying the invention is believed to be substantially apparent from the foregoing description, it is expedient to make the application complete to point out that, at the start-up of a cleaning operation on a die such as ED inserted in the opening in the top of support member or spider SP for such operation, to so insert such die and then, of course, close and clamp the lid 12 of tank, vat, tub or enclosure 10. Master switch MS is then actuated to close one of the previously traced energizing circuits for motor M and thus cause the rotation of spider SP and die ED along with the reciprocative actuation or movement of conduit FC and its associated fluid nozzle FN. The cleaning material, such as a fluid or slurry at a substantially high pressure is then supplied from a suitable source thereof and over flexible conduit H to the right hand end of conduit FC by the opening of valve V. The high pressure source of cleaning material per se is not shown for purposes of simplification of the drawing as previously mentioned. However, the provision of such a source is obvious and will be readily apparent to those skilled in the art. Said cleaning fluid or material then issues downwardly from nozzle FN and impinges against the upper surface of rotating die ED, and the extrusion material remaining in the extrusion-forming passages or channels embodied in the die, to push or force the extrusion material from said passages or channels and subsequently wash such channels or passages. The expended cleaning materal or fluid passes, of course, downwardly throuh said drain or drain pipe 11 as also previously mentioned. Such operation is continued until the die such as ED is cleaned to the desired extent and the operation of the apparatus or machine may have to be interrupted one or more times during a cleaning cycle to permit opening of the lid 12 of enclosure or tank 10 and examination of the condition of said die before final removal thereof from said enclosure. In any event, the high pressure supply of cleaning material supplied to conduit FC is terminated, by manual actuation of valve V, prior to stopping of the rotation of support member or spider SP and the reciprocative actuation of said conduit by the actuation of master switch MS to open its circuit controlling contacts. Said supply of cleaning material is also, of course, terminated prior to opening of lid 12 of enclosure 10.

It should be pointed out that the reciprocative actuation of conduit FC and, thereby nozzle FN can be for a distance such that the reciprocative path of travel of such components is greater than the radius of a die such as ED and, in such event, slide unit UN would be longer than that shown in the drawing and the limit switches such as LS1 and LS2 would be located correspondingly.

Although there is herein shown and described only one form of apparatus or machine embodying the invention, it will be understood that various changes and modifications may be made therein within the purview of the appended claims without departing from the spirit and scope thereof.

What is claimed is:

1. An apparatus for cleaning dies used for extrusion-forming of a ceramic material in a plastic state into formed cylindrical bodies, each such die having a plurality of passages each of relatively minute cross-sectional area extending longitudinally through each respective die generally normal to the ceramic material entrance and exit ends of the die, said apparatus comprising, in combination;
   A. a tank having a drain opening through the bottom thereof and otherwise arranged to be fluid-tight;
   B. a rotatable support member including a drive shaft rotatably mounted within said tank for rotatably supporting each of said dies to be cleaned with said entrance and exit ends of each respective die substantially exposed and generally horizontally disposed, such support member comprising a generally open framework for ready drainage of fluid cleaning material therefrom;
   C. a fluid conduit having on one end thereof a high pressure nozzle directed downwardly above said support member and spaced therefrom, such conduit extending snugly and slidably through a gland provided in a side of said tank in a fluid-tight relationship therewith and the second end of the conduit being connectable with a high pressure source of cleaning material;
   D. drive means clamped to said fluid conduit for reciprocative sliding movement thereof within said gland and corresponding movement of said nozzle above and generally parallel with the upper end of a die when supported by said support member for cleaning thereof;
   E. reversible motor means coupled with said drive shaft of said support member and with said fluid conduit drive means for imparting rotational movement and reciprocative sliding movement to the support means and to said conduit, respectively;
   F. a pair of first and second electrical circuit controlling limit switches supported to be actuated by said drive means when said fluid conduit reaches first and second selected limits, respectively, of its reciprocative path of movement; and
   G. electrical circuit means controlled by said limit switches for reversibly energizing said motor accordingly as said first and second limit switches are actuated by said drive means.

2. Apparatus in accordance with claim 1 and further including a flow control valve interposed between said fluid conduit and said source of cleaning material.

3. Apparatus in accordance with claim 2 and further including a manually actuable electric switch for controlling a supply of electrical energy to said limit switches and said electrical circuit means.

4. Apparatus in accordance with claim 3 and in which said source of cleaning material is a high pressure source of water.

5. Apparatus in accordance with claim 2 and in which said source of cleaning material is a high pressure source of water.

6. Apparatus in accordance with claim 1 and further including a manually actuable electric switch for controlling a supply of electrical energy to said limit switches and said electrical circuit means.

7. Apparatus in accordance with claim 6 and in which said source of cleaning material is a high pressure source of water.

8. Apparatus in accordance with claim 1 and in which said source of cleaning material is a high pressure source of water.

* * * * *